May 17, 1966     H. A. GUSTAFSON ETAL     3,252,110
LASER END MIRROR ALIGNMENT APPARATUS
Filed Dec. 27, 1962     2 Sheets-Sheet 1
FIG. 1     FIG. 2     FIG. 3
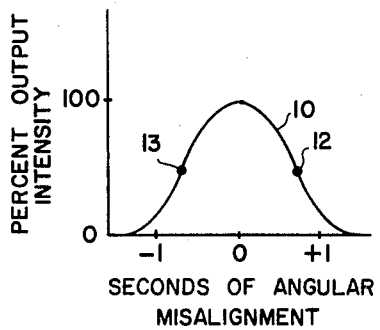
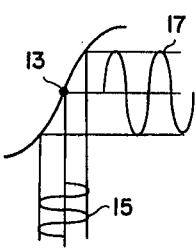
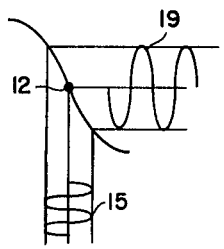
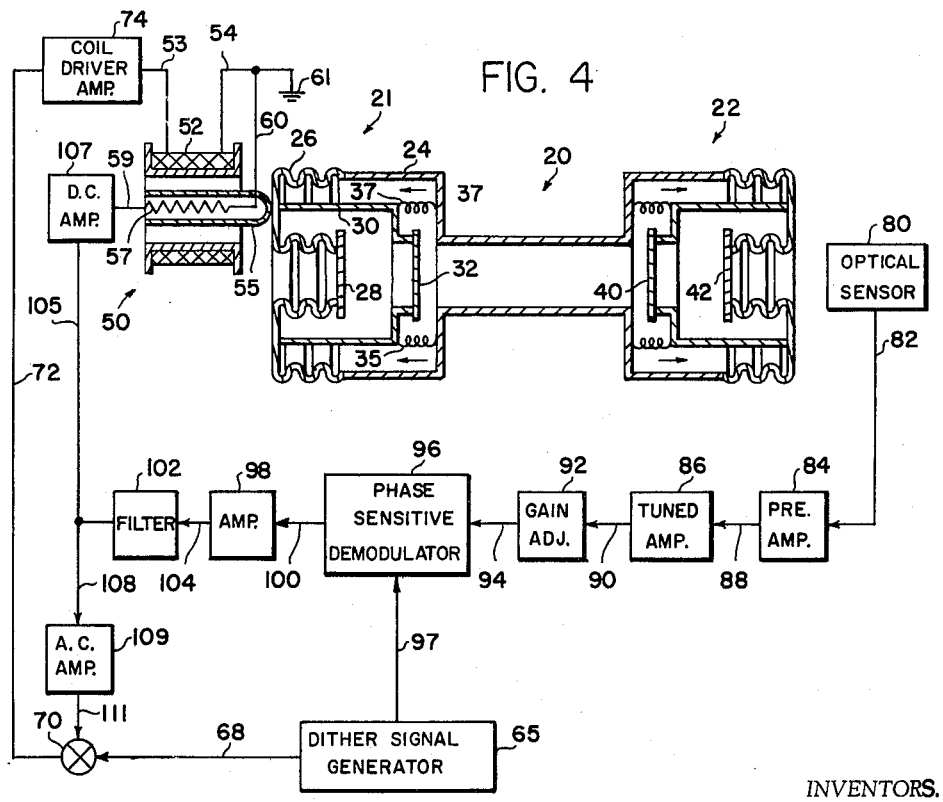
FIG. 4
INVENTORS.
JOSEPH E. KILLPATRICK
BY HARRY A. GUSTAFSON
ATTORNEY May 17, 1966 H. A. GUSTAFSON ETAL 3,252,110
LASER END MIRROR ALIGNMENT APPARATUS
Filed Dec. 27, 1962 2 Sheets-Sheet 2
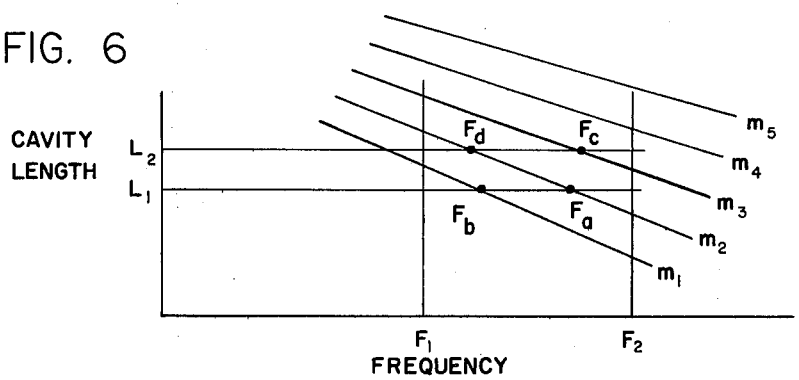
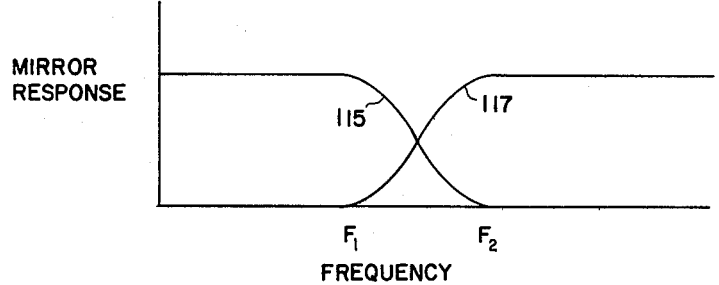
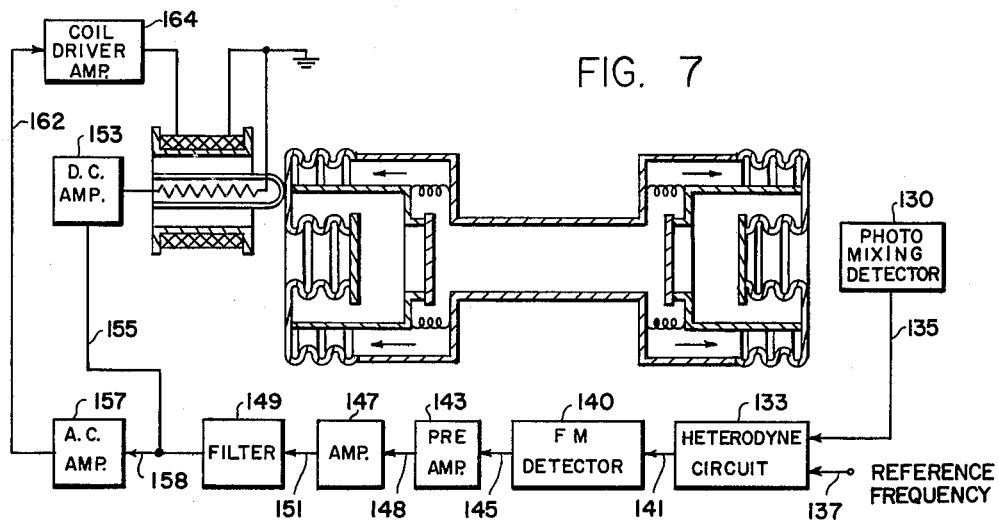
INVENTORS.
JOSEPH E. KILLPATRICK
HARRY A. GUSTAFSON
BY
*Charles J. Ungemach*
ATTORNEY United States Patent Office 3,252,110
Patented May 17, 1966

3,252,110
LASER END MIRROR ALIGNMENT APPARATUS
Harry A. Gustafson and Joseph E. Killpatrick, Minneapolis, Minn., assignors to Honeywell Inc., a corporation of Delaware
Filed Dec. 27, 1962, Ser. No. 248,836
9 Claims. (Cl. 331—94.5)

This invention relates to control apparatus and more particularly to apparatus for controlling the position of the end mirrors of masers. As used in the specification, masers is a generic term which includes masers, lasers and irasers.

In the field of masers and particularly optical masers or lasers it has long been known that the alignment of the end mirrors is of critical importance in order to maintain maximum output and that the distance between the mirrors or the cavity length is of critical importance in maintaining the proper frequency output from the maser. Frequently the mirrors after being correctly aligned are subjected to forces which cause misalignment and to the present no suitable system has been devised for maintaining mirror alignment during operation of the maser. It is an object of the present invention to realign the end mirrors of a maser when they become misaligned through the variety of forces acting thereon and to maintain proper alignment throughout the operation of the maser. It is also an object of the present invention to provide apparatus which will maintain the proper cavity length in a maser regardless of forces tending to change this length.

Briefly, the invention comprises a servoloop system which detects changes of alignment or cavity length and operates to change alignment or cavity length by means of a plurality of magnetostrictive and thermal transducers.

A more complete understanding of the present invention will be obtained upon an examination of the following specification and claims when read in view of the drawings of which:

FIGURE 1 is a graph showing the change of output intensity of a maser with angular misalignment of the end mirrors;

FIGURE 2 shows a first portion of the curve of FIGURE 1 with a dither signal operating therewith;

FIGURE 3 is a graph showing a second portion of the curve of FIGURE 1 with a dither signal operating therewith;

FIGURE 4 shows a first embodiment of the present invention in schematic and block diagram form which is operable to maintain proper alignment in a maser;

FIGURE 5 is a graph showing how the maser mirror response varies with frequency of the signal to the magneto-strictive and thermal transducer;

FIGURE 6 is a graph showing the frequency obtainable at various cavity lengths; and FIGURE 7 is a second embodiment of the present invention in schematic and block diagram form operable to maintain a desired cavity length.

Referring to FIGURE 1, a curve 10 is shown which shows how variation of angular alignment between the end mirrors of a maser may produce drastic change in the output intensity thereof. It is seen from FIGURE 1 that misalignment of the mirrors by as little as one second of arc on either side of the desired aligned position may cause almost complete loss of intensity in the output beam of the maser. A misalignment of, for example, about .4 second of arc would cause the percent of output intensity to drop from 100% to 50% at either points 12 or 13. By sensing the output intensity from the maser and providing suitable control apparatus, realignment of the mirrors may be accomplished.

In order to detect the direction of misalignment it is necessary to know whether the output intensity has decreased because of a positive or of a negative misalignment of the mirrors. In other words it would be necessary for the detecting apparatus upon receiving a 50% decrease in output intensity to determine whether the mirrors had been misaligned so that the maser was operating at point 12 or at point 13 in FIGURE 1. A detection of which portion of the curve the maser is operating on may be obtained with a variety of differentiating networks but in the preferred embodiment, is performed by means of a dither signal which introduces into the mirror alignment system a small oscillating motion. As seen in FIGURE 2 wherein the left half portion of the curve of FIGURE 1 is shown and wherein it is assumed that the operation has fallen off to 50% intensity at point 13 a dither signal shown as waveform 15 will produce an output variation waveform such as shown as 17 in FIGURE 2. It is seen that this output first increases in intensity and then decreases in intensity. In FIGURE 3 which shows the right hand portion of the curve of FIGURE 1 and wherein it is assumed the maser is operating about point 12 the same dither signal 15 will produce an output waveform 19. It is seen that output 19 first decreases and then increases in intensity. In other words, by means of the dither signal a determination may be made as to whether the maser is operating on the left hand or the right hand portion of the curve of FIGURE 1 since the phase of the output dither signal 17 in FIGURE 2 is 180° from the output dither signal 19 of FIGURE 3. Therefore, by detecting the phase of the dither signal output, a determination may be made as to the direction of the mirror misalignment.

Referring now to FIGURE 4, apparatus is shown for detecting the output of a maser, for determining in which direction any misalignment has occurred and for appropriately realigning the mirrors accordingly. In FIGURE 4 a maser 20 is shown having end portions 21 and 22. End portions 21 and 22 are shown to be identical for purposes of convenience and only end portion 21 will be described in detail. End portion 21 comprises a cup-shaped extension 24 joined to the body of the maser. A torroidal bellows 26 is shown joined to the cup-shaped portion 24 and a window 28 which may be fixed with respect to the base upon which the apparatus is mounted is shown connected to the inner portion of bellows 26. A mounting member 30 which may be cup shaped is shown connected to the torroidal bellows 26 and is shown extending to support a reflector or mirror 32. Springs 35 and 37 are shown biasing the cup-shaped member 30 towards the left in FIGURE 4 as shown by the arrows. It is thus seen that the mirror is mounted so as to allow movement by suitable means for adjusting the position of the bellows 26. A mirror 40 and a window 42 are mounted in similar fashion in the end portion 22. The mounting means described for the mirrors and window above is only one possible method of mounting the mirrors in a maser and other equally suitable means may be employed satisfactorily as long as one end mirror is allowed to be moved with respect to the other. For example member 30 may have three or more separate legs each of which may be in contact with a separate bellows and thus eliminate the torroidal bellows 26. The output energy beam from the maser 20 may progress out either of the windows 28 or 42 for its ultimate use.

To position end mirror 32 with respect to end mirror 40 a plurality of magnetostrictive transducers, one of which is shown by arrow 50 in FIGURE 4, is employed. A magnetostrictive transducer operates to change length upon a change of magnetic field therearound and the frequency response of the magnetostrictive transducer to change in magnetic field is quite high which is desirable since misalignment of the end mirrors may occur at rather high frequencies. It is known however, that temperature also effects a magnetostrictive transducer so that it changes length with changes in temperature. This effect is much slower than is the change of length with changing magnetic field. The invention shown in FIGURE 4 utilizes both effects to obtain overall compensation as will be explained hereinafter.

The magnetostrictive transducer of FIGURE 4 may comprise a coil 52 having leads 53 and 54 and being wrapped around a hollow tube of nickel 55 although other magnetostrictive materials may be equally well utilized. Within the hollow portion of the tube 55 is placed a heater 57 having leads 59 and 60 associated therewith. Lead 60 is shown joined to lead 54 and to ground 61 in FIGURE 4. Heater 57 is utilized in the present invention to establish the temperature of the magnetostrictive element and to cause low frequency changes in length when necessary. Tube 55 is shown pressing against one portion of the bellows 26 and it can be seen that a change in length of tube 55 will cause motion of the mirror 32. Two or more magnetostrictive transducers such as 50 will normally be utilized in the invention and will be spaced around the periphery of bellows 26 so as to cause motion of mirror 32 about two mutually perpendicular axes. In the preferred embodiment three transducers spaced 120° apart are utilized although one of these transducers may be a fixed member and not used to change length in the embodiment of FIGURE 4. It can be seen that by properly providing signals to the magnetostrictive transducer 50 and to another transducer suitably positioned around the periphery of bellows 26 that angular alignment of mirrors 32 and 40 may be accomplished in each of two mutually perpendicular axes.

As was previously mentioned a dither signal is utilized to cause mirror 32 to oscillate with respect to mirror 40 in order to determine which direction in which misalignment of the system had occurred. This signal is generated by a dither signal generator 65 on an output conductor 68 through a summing network 70, a conductor 72 and a coil drive amplifier 74 to lead 73 of the coil 52 of transducer 50. A similar dither signal generator not shown would drive the other of the magnetostrictive devices but at a different frequency. This other dither signal would be utilized to detect displacement in the other axis and is performed at a different frequency so that misalignments in the two axes may be discriminated. For purposes of simplicity we will describe the operation about one axis only utilizing magnetostrictive transducer 50, but bearing in mind that similar operation occurs about the other axis.

As shown in FIGURE 4, an optical sensor 80 is placed so as to receive output energy from the maser 20. Optical sensor 80 may be a standard lead sulfide cell or any such device capable of producing an output in accordance with received input energy intensity. The output from optical sensor 80 is presented by means of a conductor 82 to a preamplifier 84. The amplified output from preamplifier 84 is presented to a tuned amplifier 86 by means of a conductor 88. Tuned amplifier 86 is adjusted to receive the frequency of the dither signal and to reject other frequencies. The output from tuned amplifier 86 will be a signal of the dither frequency of magnitude which varies with the misalignment of mirrors 32 and 40, and of phase indicative of the direction of misalignment. This output is presented by a conductor 90 to a gain adjust device 92 which may be a potentiometer or some similar device for adjusting the gain of the system. The purpose of the gain adjust 92 is to enable the setting of an initial threshold value which is considered to be the system null point. The output of the gain adjust device 92 is presented on a conductor 94 to a phase sensitive demodulator 96 which has a reference input from the dither signal generator 65 presented thereto by means of a condutcor 97. Demodulator 96 operates to remove the dither frequency and to present a D.C. signal of magnitude indicative of the displacement of the mirrors. This signal may be a constant D.C. signal or it may be varying at a frequency dependent upon the variations occuring in the alignment of mirrors 32 and 40. Some disturbances of the system may cause very fast mirror displacements and other disturbances may cause very slow mirror displacements. The high frequency displacements are compensated for by changing the magnetic field around the magnetostrictive transducer while the low frequency displacements are compensated for by changing the current to the heater 57 of the magnetostrictive transducer 50. The output signal from demodulator 96 is presented to an amplifier 98 by means of a conductor 100. Amplifier 98 is of a sort capable of amplifying both D.C. and A.C. signals, and has an output which is presented to a filter 102 by means of a conductor 104. Filter 102 operates to remove any of the dither freqency signal which may remain in the circuit at this time so that the output from filter 102 is a signal of magnitude indicative solely of the misalignment of the mirrors 32 and 40. As mentioned previously, this output may be a relatively constant or low frequency signal or it may be a high frequency signal depending upon the character of the misalignment of mirrors 32 and 40. The output from filter 102 is presented by means of a conductor 105 to a D.C. amplifier 107 which has an output connected to conductor 59 of heater 57. The output of filter 102 is also connected by a conductor 108 to an A.C. amplifier 109. Outputs from filter 102 which are constant or in a low frequency range are amplified by the D.C. amplifier 107 in order to increase or decrease the amount of heat to heater 57. Outputs from filter 102 which are in a high frequency range are amplified by the A.C. amplifier 108 to produce a corresponding output on a conductor 111. The output from A.C. amplifier 109 is presented by the conductor 111 to the summing circuit 70 having its other input connected to the dither signal generator. The summing circuit may merely be standard parallel resistors although a common cathode differential amplifier or other such device may be used to separate the two inputs and prevent any cross coupling that might exist. The dither signal and the signal from amplifier 109 are added together and the resultant signal is presented by means of the conductor 72 to a coil driver amplifier 74 which has an output connected to lead 53 and which operates to change the magnetic field produced by coil 52. Thus it is seen that outputs from the filter 102 which are in the high frequency range cause changes in the magnetic field associated with the magnetostrictive device 50 and thereby quickly cause changes of length of tube 55 to bring the mirror 32 back into alignment with mirror 40. Signals in the low frequency range do not operate through the magnetic field of the transducer 50 but rather operate to change the heat produced by heater 57 and thus change the length of the tube 55 to compensate for slowly varying changes in alignment of the mirrors. Heater 57 also acts to stabilize the temperature of the tube 55 to compensate for changes of temperature occasioned by changes of current through the coil 52.

FIGURE 5 shows how the mirror response operates in accordance with outputs from the filter 102 of various frequencies. In FIGURE 5 a curve 115 represents the way the mirror 32 would respond to signals from filter 102 if the line 108 to the A.C. amplifier 109 were opened and only the operation of D.C. amplifier 107 were considered. It is seen that at low frequencies mirror 32 responds completely to changes of signal but that as the frequency of the signal is increased the response falls off to a point shown at $F_2$ in FIGURE 5 beyond which substantially no further mirror response can be obtained solely by the heating of the transducer. Curve 117 shows the mirror response which would develop if the circuit between filter 102 and D.C. amplifier 107 were opened so that only the A.C. portion of the circuit were operative. It is seen that at high frequencies the mirror response is complete but at the lower frequencies it falls off so that below a frequency represented by point $F_1$ in FIGURE 5 substantially no further response is obtained. It is further seen that between points $F_1$ and $F_2$ both the heating effect and the magnetic field changing effect operate. By properly choosing the magnetostrictive transducer, and by careful design of the electronic components, curves 115 and 117 can be made so that they add to provide somewhat the same response throughout the entire frequency range.

Magnetostrictive transducers can be chosen wherein the response to the magnetic field is in itself substantially constant throughout the entire frequency range. In such a case, no separate D.C. circuit and no heater would be necessary were it not for the fact that changing the current to the coil operates to increase the heat to the transducer. When nickel is used as the magnetostrictive element it is found that an increase of current in coil 52 causes a decrease in the length of element 55 by changing the magnetic field thereto. At the same time however, increase in current causes an increase in heat to the tube 55 which operates to increase its length. That is, the effects are opposites and in the long run the temperature effect is the greater of the two. In other words, if it were not for the heater 57 no rebalance of the system would be possible for long duration changes of current to the coil 52 because the change in heat would cause the transducing element 55 to change length in a direction opposite to that desired. If the heating effect alone were used the system would not respond quickly enough to changes in mirror alignment and hence in the preferred embodiment a combination of the heating effect and the magnetic field effect have been utilized. Magnetostrictive transducers are available in which the coefficient of thermal expansion would be in the same direction as the expansion due to magnetic field changes in which case is would be possible to utilize solely the changes in magnetic field to compensate the system for misalignments. However, it should be remembered that the change of length occasioned by changes in magnetic field are very rapid compared to the changes in length occasioned by change of heat. Thus adequate provisions would have to be utilized to assure proper correlation between the heating effect of coil 52 and its magnetic field effect. In the preferred embodiment it is deemed preferable to utilize nickel as the magnetostrictive material because its coefficient of expansion is large and thus we utilize the heater 57 in order to establish the temperature of tube 55 and to compensate for slow deviations in alignment thereby. It should be remembered however, that other materials may be employed and that under some circumstances heater 57 might not be necessary.

It is thus seen that the apparatus of FIGURE 4 will operate to control the position of mirror 32 with respect to mirror 40 and to maintain alignment of these mirrors when they are misaligned due to various vibrational forces affecting the maser. As mentioned previously, a second transducer would normally be employed to compensate for changes of alignment occurring in the opposite axis. To accomplish this in FIGURE 4, a second channel would be employed similar to that described in FIGURE 4, but utilizing different frequency dither signals.

In order to compensate for changes in the distance between mirrors 32 and 40 a similar but somewhat different circuit is employed. It has been found that the output beam from a maser will contain several modes of energy, that is to say, more than one resonant frequency normally exists in the output energy beam. Referring to FIGURE 6, a graph showing cavity length versus frequency is presented. From the equations $$\frac{M\lambda}{2} = L$$

and $\quad \lambda f = C$ where L is the cavity length, $\lambda$ is the wave length and M is the number of half wave lengths in a standing wave of resonant energy being reflected between the mirrors, $f$ is frequency and C is the velocity of light, a number of different resonant conditions may exist for a given cavity length depending upon the number of cycles of energy being resonated. In FIGURE 6, five lines identified as $M_1$ through $M_5$ are drawn each representative of a different possible number of cycles resonating within the cavity. These lines are portions of reciprocal curves but are shown straight because they are substantially so throughout the small operating range. Assuming that the cavity length were $L_1$ a line drawn horizontally will intersect a number of these lines $M_1$ through $M_5$. For a given maser material or medium utilized in the maser and for a given number of other parameters such as mirror shape there is a certain limit to the number of possible frequencies available in the output of the maser and these have been shown in FIGURE 6 as lying between $F_1$ and $F_2$. For a helium neon optical maser the distance between $F_1$ and $F_2$ is approximately 900 mc. With a length $L_1$ utilized the two frequencies which exist on the output energy beam have been identified by points on $L_1$, $F_a$ and $F_b$. For a helium neon optical maser the frequency difference between $F_a$ and $F_b$ is approximately 150 mc. so that in actual practice five or six various frequencies may exist in the output beam wherein in FIGURE 6 only two have been shown. If the cavity length were to increase from $L_1$ to $L_2$ a different group of lines $M_1$ through $M_5$ would be intercepted and these have been shown in FIGURE 6 as points $F_c$ and $F_d$. If it is assumed that for length $L_1$ the frequency difference between $F_a$ and $F_b$ is 150 mc., then the frequency difference at $L_2$ would be different by a small amount say about 400 c.p.s. For convenience in analysis let us assume the new frequency is 149 mc. If it is desired to maintain the cavity length constant at $L_1$ then it is only necessary to maintain the frequency difference between the frequencies in the output energy beam at 150 mc. since any variation in cavity length will produce a different frequency difference. By detecting this frequency difference and causing change in the position of mirror 32 with respect to mirror 40 a constant cavity length can be maintained. Apparatus for accomplishing this is shown in FIGURE 7.

In FIGURE 7 the output energy from the maser is presented to a photomixing detector 130. Photomixing detector may be a photo multiplier or other such device capable of producing an output indicative of the difference of frequencies in the energy beam. This output difference from photomixing detector is presented to a heterodyne circuit 133 by means of a conductor 135. A reference frequency is also presented to the heterodyne circuit 133 by means of a conductor 137. Again assuming that the length $L_1$ is desired to be maintained the desired frequency difference will be 150 mc. A reference frequency of some value greater or lesser than 150 will be chosen so that the output of the heterodyne circuit 133 will have a value dependent upon the difference between the reference frequency than the frequency difference from the photomixing detector 130. For example, a reference frequency of 165 mc. may be utilized so that if the output from photomixing detector 130 is at proper value of 150 mc. the difference output of the heterodyne circuit 133 will be 15 mc. If the cavity length changes to $L_2$, the output from photomixing detector 130 will have an assumed frequency difference therein of 149 mc. and the output of the heterodyne circuit 133 would be 16 mc. Likewise if the cavity length decreased to a position lower than $L_1$ in FIGURE 6 there would be a change in the output from the photomixing detector 130 from 150 mc. to say 151 mc. and the output of the heterodyne circuit would be 14 mc. Thus the output of the heterodyne circuit 133 is indicative of the direction and magnitude of any change in cavity length. Of course the actual frequency difference would normally be much less than 1 mc. but this figure was used for convenience to avoid fractions. Of course, the output from the photomixing detector may have other frequency difference signals depending upon the number of other frequencies existing at a particular cavity length. These frequency difference signals will be multiples of 150 mc. in the case above outlined and proper filters in the heterodyne circuit will be utilized to eliminate all frequency differences other than the basic frequency difference of approximately 150 mc. or other desired frequency difference. The output from the heterodyne circuit 133 is presented to a frequency modulation detector 140 by means of a conductor 141. Frequency modulation detector 140 operates like a demodulator to convert frequency difference signals into D.C. signals of magnitude indicative of the change in cavity length. When the cavity length is correct the output from the frequency modulator detector will be a certain value and if the cavity length changes the signal will become greater or lesser than this certain value depending upon the direction of change. If the change in cavity length occurs by various amounts due to vibration of the maser mirrors the output from the FM detector 140 will be an alternating signal of magnitude indicative of the amount of change of cavity length and of frequency which varies with the frequency of vibration of the mirrors.

The output of the FM detector 140 is presented to a preamplifier 143 by means of a conductor 145 where it is amplified and presented to an amplifier 147 by means of a conductor 148. Preamplifier 143 and amplifier 147 operate to amplify both A.C. and D.C. signals and the output of amplifier 147 is presented to a filter 149 by means of a conductor 151. Filter 149 operates to remove any high frequency signals that may exist from the heterodyning and FM detector circuits. The output of filter 149 is presented to a D.C. amplifier 153 by means of a conductor 155 and to an A.C. amplifier 157 by means of a conductor 158. D.C. amplifier 153 operates to amplify only constant or low frequency range signals and as with FIGURE 4 operates to change the current to the heater in the magnetostrictive transducer. A.C. amplifier 157 operates to amplify only those signals in the high frequency range so as to change the current to the coil of the magnetostrictive transducer by means of a conductor 162 and the coil driving amplifier 164. Thus changes in cavity length which occur at high frequencies are compensated for by changes of current to the coil of the magnetostrictive transducer while changes of cavity length in the low frequency range are compensated for by changes of current to the heater of the magnetostrictive transducer. The magnetostrictive transducer and the maser structure of FIGURE 7 are the same as that shown in FIGURE 4 and will not be described in further detail.

In order to move the mirror so as to change cavity length without changing alignment three or more magnetostrictive transducers would normally be employed equally spaced around the periphery of the bellows. With the apparatus of FIGURE 7 the output from filter 149 would be sent to all three transducers thus moving the mirror with respect to the other mirror while keeping the alignment.

It is possible to combine the structure of FIGURE 4 and FIGURE 7 with three magnetostrictive structures utilizing the electrical circuitry of FIGURE 4 to adjust the position of two of the transducers with respect to the other for purposes of alignment and utilizing the circuitry of FIGURE 7 with all three transducers to adjust the cavity length. In such a case the circuitry of FIGURE 7 would be made insensitive to the dither frequency used with FIGURE 4 by suitable filters or the like. The two circuits would be used in parallel and both alignment and length control would be assured. The final amplifier for both circuits could be the same and some of the other components might be jointly utilized by both circuits.

It is therefore seen that apparatus has been provided for maintaining the length of the cavity in a maser at a desired distance. Apparatus has also been provided for aligning the mirrors so as to maintain optimum output.

In FIGURE 4 and in FIGURE 7, the various ground connections and power connections have not been shown for reasons of simplicity.

Obviously, those skilled in the art will find various changes and improvements in the apparatus described in the preferred embodiments above without departing from the spirit of the invention. In the above descriptions a number of components have been described which may be standard amplifiers, detectors and demodulators, all of which may have various obvious substitutions. The order of the elements above described is not critical nor is the number of amplifiers, the shape and size and construction of the maser or the exact configuration of the magnetostrictive transducer. We therefore do not intend to be limited by the specific disclosures utilized in describing the preferred embodiments but intend only to be limited by the following claims.

We claim:

1. Apparatus of the class described comprising, in combination: a movable member normally having a predetermined position and having a surface for reflecting energy from an energy source; a plurality of magnetostrictive means mounting said movable member and operable to change in dimension in accordance with a change in temperature and applied magnetic field so as to move said movable member; coil means operable to supply energy to said plurality of magnetostrictive means to cause magnetic dimension change; heater means operable to heat said magnetostrictive means to cause thermal dimension change; detector means mounted to receive energy reflected from the surface of said movable member and operable to produce an output indicative of the energy received, movement of said movable member from the predetermined position changing the energy received by said detector means and thus changing the output therefrom; and means connecting said detector means to said coil means and to said heater means so that a change in the output from said detector means causes said coil means and said heater means to change the dimension of said plurality of magnetostrictive means and move said movable means towards the predetermined position.

2. Apparatus for aligning the end mirrors of a maser comprising, in combination: magnetostrictive means having an input and operable upon a change of temperature and applied magnetic field to change length; means coupled to said magnetostrictive means for applying a change of temperature and a magnetic field thereto; means connecting said magnetostrictive means to a first of said end mirrors to change the angular alignment of the first of said end mirrors with respect to the other of said end mirrors upon a change of length of said magnetostrictive means, the energy output of the maser varying from a predetermined value with a change of alignment of said end mirrors; energy sensing means mounted to receive the energy output of the maser and having an output in accordance therewith; and means connecting said energy sensing means to said means coupled to said magnetostrictive means so that upon a change in energy from the maser from the predetermined value, the output from said energy sensing means changes the temperature and applied magnetic field on said magnetostrictive means to cause angular alignment change of the first of said end mirrors in such a direction as to restore the energy output from the maser to the predetermined value.

3. Apparatus for use with a maser having first and second end mirrors and an energy output which varies from a predetermined value with the alignment of the first and second end mirrors comprising, in combination: a magnetostrictive rod connected to the first end mirror and operable upon a change of length to vary the angular position of the first end mirror and thus vary the alignment between the first and second end mirrors, the length of said magnetostrictive rod changing upon a change of magnetic field associated therewith and upon a change of temperature; magnetic means supplying a magnetic field to said magnetostrictive means; heater means supplying heat to said magnetostrictive means; energy sensing means mounted to receive the energy output of the maser and operable to provide a signal indicative of a change of energy output from the predetermined value; means connecting the energy sensing means to said magnetic means and to said heater means to cause said magnetostrictive means to change length and to move the first end mirror in such a direction as to restore the alignment of the first and second end mirrors.

4. Apparatus for use with a maser which has first and second end mirrors and an output energy beam which is of maximum intensity when the end mirrors are aligned, said maser being subjected to various forces which cause misalignment of the end mirrors at various frequencies and thereby causing intensity fluctuations of the output energy beam comprising, in combination: sensing means mounted to receive energy from the output energy beam and to provide a signal which varies with fluctuations in the intensity thereof; A.C. amplifier means connected to said sensing means to receive the output signal therefrom and operable to provide an output signal which varies with fluctuations in the intensity of the maser output beam which are in a relatively high frequency range; D.C. amplifier means connected to said sensing means to receive the output signal therefrom and operable to provide an output signal which varies with fluctuations in the intensity of the maser output beam which are in a relatively low frequency range; magnetostrictive means connected to the maser and operable upon a change of length to move the first end mirror with respect to the second end mirror to vary the alignment therebetween, said magnetostrictive means responding to relatively high frequency magnetic field changes and responding to relatively low frequency temperature changes to produce a change of length; magnetic means connected to said A.C. amplifier means to receive the output therefrom and to provide magnetic field changes for said magnetostrictive means in accordance with fluctuations of the intensity of the maser output beam which are in the relatively high frequency range; and heater means connected to said D.C. amplifier means to receive the output signal therefrom and to provide temperature changes for said magnetostrictive means in accordance with fluctuations of the intensity of the maser output beam which are in the relatively low frequency range, said magnetostrictive means varying the alignment of said first and second end mirrors under the influence of said magnetic means and said heater means so as to substantially maintain the maximum intensity of the output energy beam from said maser.

5. Apparatus of the class described comprising, in combination: a maser having an energy output and having first and second end mirrors, said maser being subjected to various forces which cause misalignment of the end mirrors, the misalignments taking place at various frequencies from a relatively high range to a relatively low range which cause corresponding energy output changes from said maser; magnetostrictive means connected to the first end mirror and operable upon a change of length to change the position of the first end mirror with respect to the second end mirror, said magnetostrictive means changing length quickly upon a change of magnetic field associated therewith and changing length more slowly upon a change of temperature; magnetic means supplying a magnetic field to said magnetostrictive means; heater means supplying heat to said magnetostrictive means; sensing means mounted to receive energy from said maser and operable to provide an output signal corresponding to output energy changes from said maser; A.C. amplifier means connected to said sensing means to receive the output signals therefrom and operable to provide an output signal in accordance with output energy changes from said maser which are in the relatively high range of frequencies; D.C. amplifier means connected to said sensing means to receive the output signal therefrom and operable to provide an output signal in accordance with output energy changes from said maser which are in the relatively low range of frequencies; means connecting said A.C. amplifier to said magnetic means so that the output from said A.C. amplifier changes the magnetic field of said magnetostrictive means to cause high frequency position changes of said first end mirror to compensate for misalignments of said first and second end mirrors in the relative high frequency range; and means connecting said D.C. amplifier to said heater means so that the output from said D.C. amplifier changes the heat supplied to said magnetostrictive means to cause low frequency position changes of said first end mirror to compensate for misalignments of said first and second end mirrors in the relatively low frequency range.

6. Apparatus for use with a maser having end mirrors normally arranged in an aligned position but being subjected to forces tending to move the mirrors from the aligned position into misalignment at various frequencies and having an output energy beam which has maximum intensity when the end mirrors are in the aligned position and an intensity when misaligned which varies with the amount of misalignment, the apparatus comprising: magnetostrictive means connected to a first of the end mirrors, said magnetostrictive means responding in a relatively high frequency range to changes of magnetic field and responding in a relatively low frequency range to changes of temperature to change length so as to position the first of the end mirrors with respect to the other end mirror; magnetic field producing means operable to change the magnetic field of said magnetostrictive means; first means connected to said magnetic field producing means to supply a dither signal thereto so as to oscillate the first of the end mirrors at a first frequency about an intermediate position which intermediate position normally coincides with the aligned position of the end mirrors; second means connected to said magnetic field producing means to supply signals in the relatively high frequency range thereto which cause said magnetostrictive means to move the first end mirror so as to change the intermediate position; heater means connected to said magnetostrictive means to change the temperature thereof; third means connected to said heater means to supply signals in the relatively low frequency range thereto which cause said magnetostrictive means to move the first end mirror so as to change the intermediate position; sensor means mounted to receive energy from the maser and to produce an output signal when the end mirrors are misaligned, the output signal varying in accordance with variations in the intensity of the output energy beam; frequency selective means connected to said sensor means to receive the output signal therefrom and to produce an output signal of the first frequency, the output signal of said frequency selective means having a phase dependent upon the direction of movement of the intermediate position from coincidence with the aligned position and having a magnitude dependent upon the amount of misalignment of the end mirrors; demodulator means connected to said frequency selective means to receive the output therefrom and to produce an output signal of frequency dependent upon the various frequencies of misalignment, the output signal of said demodulator means having a sense dependent upon the direction of movement of the intermediate position from coincidence with the aligned position and having a magnitude dependent upon the amount of misalignment of the end mirrors; and means connecting said demodulator means to said second means and to said third means to present the output signal from said demodulator means thereto so as to control said magnetostrictive means in both the high frequency range and in the low frequency range to position the first end mirror so that the intermediate position is maintained proximate to the aligned position.

7. Apparatus for maintaining a predetermined cavity length between the end mirrors of a maser comprising, in combination: a photomixing detector mounted to receive energy from the maser and to produce an output signal which contains a difference frequency between two frequencies existing in the maser output; means for generating a reference frequency; heterodyning means connected to said photomixing detector to receive the output signal therefrom and to produce an output signal which varies with the difference between the frequency of the output signal from said photomixing detector and said reference frequency; FM detector means connected to said heterodyning means to produce a demodulated output which varies in magnitude with the variations in frequency in the output of said heterodyning means; and motive means responsive to applied changes in temperature and magnetic field connected to one of the end mirrors of the maser and connected to said FM detector to receive the demodulated output therefrom, said demodulated output controlling the applied temperature and magnetic field so as to move one of the end mirrors in accordance with an applied temperature or magnetic field with respect to the other of the end mirrors to maintain the predetermined cavity length between the end mirrors.

8. Apparatus for use with a maser having an output beam containing at least two frequencies of energy the difference between which varies with the distance between the end mirrors of the maser comprising, in combination: frequency difference sensing means mounted to receive energy from the output beam of the maser and operable to produce an output signal of frequency indicative of the difference between the two frequencies of energy in the output beam; means for generating a reference signal at a predetermined frequency; heterodyning means connected to said frequency difference sensing means to receive the output therefrom, connected to said reference signal source to receive a signal at said predetermined frequency and operable to produce an output signal of frequency indicative of the difference between the frequency of the output signal from said frequency difference sensing means and the frequency of the reference signal; converting means connected to said heterodyning means to receive the output signal therefrom and operable to provide an output signal of magnitude which varies with the frequency of the output signal from said heterodyning means; and magnetostrictive means connected to said converting means to receive the output signal therefrom and operable to change length in accordance with variations in temperature and magnetic field, said variations in temperature and magnetic field being controlled by the output signal from said converting means, said magnetostrictive means being connected to the end mirrors of said maser so as to change the distance therebetween with changes in length of said magnetostrictive means and to maintain a predetermined distance between the end mirrors of the maser.

9. Apparatus for use with the maser having an output beam containing at least two frequencies of energy, the difference frequency between the two frequencies of energy varying with variataions of the distance between the end mirrors of the maser comprising, in combination: detector means mounted to receive energy from the output beam of the maser and operable to produce an output signal indicative of the difference frequency between the two frequencies of energy in the output beam of the maser; comparing means connected to said detector means to receive the output signal therefrom, connected to a source of reference signal of predetermined frequency and operable to produce an output signal which varies with variations of the difference in frequency between the reference signal and the output signal from said detector means; magnetostrictive means operable to change length relatively rapidly upon a change of magnetic field and to change length relatively slowly upon a change of temperature; magnetic field changing means connected to said comparing means to receive the output therefrom, said magnetic field changing means responding to changes of the output signal from said comparing means which are a relatively high frequency range to change the magnetic field to said magnetostrictive means; temperature changing means connected to said comparing means to receive the output therefrom, said temperature changing means responding to changes of the output signal from said comparing means which are in a relatively low frequency range to change the temperature of said magnetostrictive means; and means connecting said magnetostrictive means to the maser so that changes of length of said magnetostrictive means cause changes in distance between the end mirrors of the maser so as to maintain a predetermined desired distance between the end mirrors.

References Cited by the Examiner

UNITED STATES PATENTS

| | | | |
|---|---|---|---|
| 3,035,492 | 5/1962 | Blythe | 88—61 |
| 3,149,290 | 9/1964 | Bennett et al. | 331—94.5 |
| 3,170,122 | 2/1965 | Bennett | 331—94.5 |

OTHER REFERENCES

Bennett et al.: "Magnetostrictively Tuned Optical Maser," Review of Scientific Instruments, vol. 33, No. 6, June 1962, pp. 601 to 605.

Boyd et al.: "Confocal Multimode Resonator for Millimeter Through Optical Wavelength Masers," Bell System Technical Journal, vol. 40, No. 2, March 1961, pp. 489 to 491.

Cook et al.: "An Automatic Fringe Counting Interferometer for Use in the Calibration of Line Scales," Journal of Research of the N.B.S., vol 65C, No. 2, April-June 1961, pp. 129 to 140.

Forrester: "Photoelectric Mixing As a Spectroscopic Tool," Journal of the Optical Society of America, vol. 51, No. 3, March 1961, pp. 253 to 258.

Javan et al.: "Population Inversion and Continuous Optical Master Oscillation in a Gas Discharge Containing a He-Ne Mixture," Physical Review Letters, vol. 6, No. 3, February 1, 1961, pp. 106 to 110.

Laine: "A Proposal for a Tunable Source of Radiation for the Far Infra-Red Using Beats Between Optical Masers," Nature, vol. 191, No. 4790, August 19, 1961, pp. 795 and 796.

Ramsey: "A Rapid-Scanning Fabry-Perot Interferometer with Automatic Parallelism Control," Applied Optics, vol. 1, No. 4, July 1962, pp. 411 to 413.

JEWELL H. PEDERSEN, *Primary Examiner.*

J. L. CHASKIN, R. L. WIBERT, *Assistant Examiners.*